(12) United States Patent
Soulier et al.

(10) Patent No.: US 9,487,310 B2
(45) Date of Patent: Nov. 8, 2016

(54) SPACECRAFT FITTED WITH A DE-ORBITING DEVICE COMPRISING A DETONATION ENGINE

(71) Applicant: SNECMA, Paris (FR)

(72) Inventors: Nicolas Soulier, Fontaine Bellenger (FR); Maxime Vicentini, Dompierre sur Mer (FR); Jean-Marie Conrardy, Courcelle sur Seine (FR)

(73) Assignee: SNECMA, Paris (FR)

( * ) Notice: Subject to any disclaimer, the term of this patent is extended or adjusted under 35 U.S.C. 154(b) by 53 days.

(21) Appl. No.: 14/405,947

(22) PCT Filed: Jun. 3, 2013

(86) PCT No.: PCT/FR2013/051247
§ 371 (c)(1),
(2) Date: Dec. 5, 2014

(87) PCT Pub. No.: WO2013/182795
PCT Pub. Date: Dec. 12, 2013

(65) Prior Publication Data
US 2015/0144738 A1 May 28, 2015

(30) Foreign Application Priority Data
Jun. 5, 2012 (FR) ..................... 12 55215

(51) Int. Cl.
*B64G 1/26* (2006.01)
*B64G 1/40* (2006.01)
(Continued)

(52) U.S. Cl.
CPC ................. *B64G 1/242* (2013.01); *B64G 1/26* (2013.01); *B64G 1/40* (2013.01); *B64G 1/402* (2013.01); *F02K 9/766* (2013.01); *B64G 1/401* (2013.01)

(58) Field of Classification Search
CPC .......... B64G 1/26; B64G 1/40; B64G 1/401; B64G 1/402; B64G 1/403; B64G 1/404; F02K 9/76; F02K 9/763; F02K 9/766; F02K 9/78
See application file for complete search history.

(56) References Cited

U.S. PATENT DOCUMENTS

| | | | | |
|---|---|---|---|---|
| 5,873,240 A | * | 2/1999 | Bussing | F02K 9/972 60/207 |
| 7,278,611 B2 | * | 10/2007 | Eidelman | B64G 1/26 244/171.1 |
| 7,686,255 B2 | * | 3/2010 | Harris | B64G 1/401 244/159.4 |

(Continued)

FOREIGN PATENT DOCUMENTS

| | | |
|---|---|---|
| EP | 1 852 350 | 11/2007 |
| FR | 2 732 308 | 10/1996 |
| GB | 2 468 515 | 9/2010 |

OTHER PUBLICATIONS

Davidenko, D. M., et al., "Continuous Detonation Wave Engine Studies for Space Application", Progress in Propulsion Physics, vol. 1, pp. 353-366 (2009) XP 002692603.

(Continued)

*Primary Examiner* — Tien Dinh
*Assistant Examiner* — Richard R Green
(74) *Attorney, Agent, or Firm* — Oblon, McClelland, Maier & Neustadt, L.L.P.

(57) ABSTRACT

A spacecraft including at least one main propellant tank, a main engine fed with propellant by the main tank, and a de-orbiting device. The de-orbiting device includes a detonation engine fed with propellant by the main tank.

12 Claims, 1 Drawing Sheet

(51) Int. Cl.
  *F02K 9/76* (2006.01)
  *B64G 1/24* (2006.01)

(56) References Cited

U.S. PATENT DOCUMENTS

2006/0201134 A1 9/2006 Eidelman
2008/0053058 A1 3/2008 Eidelman
2008/0099627 A1 5/2008 Eidelman
2010/0050592 A1* 3/2010 Lu .................. F02K 7/08
  60/39.38

OTHER PUBLICATIONS

International Search Report Issued Jul. 25, 2013 in PCT/FR13/051247 Filed Jun. 3, 2013.

* cited by examiner

SPACECRAFT FITTED WITH A DE-ORBITING DEVICE COMPRISING A DETONATION ENGINE

FIELD OF THE INVENTION

The invention relates to a spacecraft fitted with a de-orbiting device, to a space launcher including such a spacecraft, and to a method of de-orbiting such a spacecraft.

STATE OF THE PRIOR ART

In order to avoid polluting or cluttering orbits in space, it is necessary to de-orbit a spacecraft after it has been used. In other words, it is necessary to move the spacecraft away from that orbit after it has been used so that the spacecraft returns to the earth's atmosphere and drops back to earth, generally being disintegrated. This thus ensures that the orbit on which a spacecraft is initially placed does not become polluted and that a new spacecraft can be put on that orbit subsequently without having its operation disturbed and without coming into collision with an old spacecraft that is no longer in use.

It is generally not possible to use the main engine of a spacecraft for de-orbiting the spacecraft since the pressure of the residual propellant within the main propellant tank is too low to enable the main engine to operate, given that the majority of the propellant is consumed by the main engine in order to put the spacecraft on said orbit, so the pressure within the main propellant tank has been reduced significantly and is no longer capable of feeding the main engine properly with propellant. Conventional main engines require propellant to be fed at some minimum pressure (of the order of a few tens of bars) in order to be able to operate.

De-orbiting devices are also known that are in the form of auxiliary devices added to a spacecraft. However, such conventional de-orbiting devices have their own propellant tanks and are therefore generally heavy, thus penalizing the performance of the spacecraft.

SUMMARY OF THE INVENTION

The object of the present invention is to remedy the above-mentioned drawbacks, at least substantially.

The invention achieves this object by providing a spacecraft having at least one main propellant tank, a main engine fed with propellant by the main tank, and a de-orbiting device, the de-orbiting device comprising a detonation engine fed with propellant by the main tank.

It can be understood that the term "spacecraft" is used to mean a vehicle that is to be sent into space. This term covers particularly, but not exclusively, a stage of a space launcher, a space launcher having only one stage, a space shuttle, a satellite, or the equivalent.

The main engine is the engine for taking the spacecraft into space or for putting it onto a predetermined orbit. The main tank is a tank for containing propellant for feeding to the main engine. Naturally, there may be one or more propellant tanks, depending on whether the main engine and the detonation engine operate using a single propellant or a mixture of a plurality of propellants. Hereafter, and unless specified to the contrary, the generic term "propellant" is used without distinction to designate the propellant or the propellants necessary for operating the main engine. The major part (about 95% or more) of the propellant contained in the main tank is consumed by the main engine during the main thrust for taking the spacecraft into space or for putting it onto a predetermined orbit. The propellant remaining after the main thrust is referred to as "residual" propellant. The initial pressure that existed within the main tank drops while the propellant is being used during the main thrust delivered by the main engine, such that the residual propellant is at low pressure in the main tank. Hereafter, the term "main thrust" designates thrust delivered by the main engine for taking a spacecraft into space or for putting it onto a predetermined orbit.

A detonation engine is a known type of engine that does not require propellant to be fed at high pressure (a pressure of a few bars suffices, e.g. 3 bars to 5 bars). It is therefore possible to use the residual propellant at low pressure that is present in the main tank for feeding a detonation engine. The de-orbiting device of the invention thus does not require a dedicated propellant tank, and is thus lighter than conventional de-orbiting devices. Furthermore, the de-orbiting device presents the advantage of using up nearly all of the residual propellant in the main tank. Thus, nearly all of the on-board propellant is used, which constitutes an advantage both from an economic point of view and from an ecological point of view.

It should be recalled that a detonation engine is an engine in which the propagation speed of the combustion wave is greater than or equal to the speed of sound. Detonation is a mode of combustion that is characterized by strong coupling between shock waves and zones of chemical reaction (combustion). These shock waves themselves trigger chemical reactions by compressing the medium up to pressures and temperatures that exceed auto-ignition conditions for the propellant (the auto-ignition point). The mean pressure that exists in the combustion chamber may be more than ten times greater than the initial pressure of the propellant (which is of the order of a few bars, e.g. in the range 3 bars to 8 bars). Finally, the expansion of the combustion gas in a diverging nozzle or in an "aerospike" enables sufficient thrust to be generated for de-orbiting a spacecraft.

Advantageously, the detonation engine includes a heater for heating the propellant, such that the propellant passes from a solid or liquid phase to a gaseous phase upstream from an injector device.

By causing the propellant to pass into the gaseous phase, the propellant is better adapted to detonation. When the detonation engine is fed with a plurality of propellants, the heater may heat one, some, or all of the propellants.

Advantageously, the detonation engine includes a combustion chamber and a cooling circuit for cooling the combustion chamber, the heater including the cooling circuit.

In other words the cooling circuit forms part of the heater. It can thus be understood that the propellant flows from the main tank to the injector device by passing through the cooling circuit. By cooling the combustion chamber, the propellant is heated. This thus produces two complementary effects: firstly the combustion chamber is cooled, which makes it possible to maintain a predetermined operating temperature, and secondly the propellant is heated in order to prepare it for detonation.

Advantageously, the detonation engine is arranged opposite from the main engine relative to the main tank.

By arranging the detonation engine and the main engine in this way, it is made easier to brake the spacecraft. The detonation engine is thus pointed in such a direction that the thrust it generates is in the opposite direction to the thrust that was generated by the main engine (and thus in the opposite direction to the resulting motion of the spacecraft). It can be understood that under normal conditions of utilization, the de-orbiting device is stopped so long as the main engine is operating, whereas the de-orbiting device operates when the main engine is stopped.

Advantageously, the spacecraft of the invention has two main tanks, namely a fuel tank and an oxidizer tank, the main engine and the detonation engine each being connected to both main tanks.

For example, the fuel may be liquid hydrogen and the oxidizer may be liquid oxygen.

Preferably, the main engine is a deflagration engine.

A deflagration engine is a conventional engine used for delivering the main thrust of the spacecraft. It should be recalled that a deflagration engine is an engine in which the propagation speed of the combustion wave is slower than the speed of sound. Such an engine needs to be fed with propellant(s) at some minimum pressure of the order of several tens of bars, and preferably at a pressure lying in the range 100 bars to 130 bars.

It should be observed that structurally speaking, a detonation engine differs from a deflagration engine in particular in that a detonation engine presents a pre-detonator for ignition. For example, a pre-detonator comprises a branch propellant feed circuit with an ignition spark plug. A deflagration engine does not have a pre-detonator.

During the main thrust delivered by the deflagration engine, the initial pressure of the propellant lying in the range 100 bars to 130 bars decreases down to a pressure of the order of about 10 bars or even less, which pressure is no longer sufficient to enable the main deflagration engine to operate. When the main engine stops, the residual propellant is thus at a pressure that is less than or equal to 10 bars. The pressure of this residual propellant is nevertheless sufficient to enable the detonation engine of the de-orbiting device to operate.

In a first variant, the detonation engine is a continuous rotating detonation engine.

Continuous rotating detonation engines are known from elsewhere. It should be recalled that in a continuous rotating detonation engine the combustion chamber is annular, and the combustion wave front is local and travels in azimuth in the annular combustion chamber. It is only necessary to use a pre-detonator to initiate the initial detonation which then propagates in azimuth in one direction or the other. Where the propellant is injected, stages of compression and of expansion repeat in alternation in autonomous manner. Specifically, an expansion wave follows the detonation wave (or compression wave), with the expansion wave thus sucking in the propellant needed for detonation on the next occasion the detonation wave front passes. It is also possible to initiate a plurality of detonations, generating a plurality of successive detonation wave fronts.

It should be observed that structurally speaking, a continuous rotating detonation engine differs from a deflagration engine in particular in that a core (or central element) inside the combustion chamber cooperates with the side walls to define an annular space. A deflagration engine does not have a core in the combustion chamber.

In a second variant, the detonation engine is a pulse detonation engine.

Pulse detonation engines are known from elsewhere. It should be recalled that in a pulse detonation engine the combustion chamber is of conventional cylindrical shape, being closed at an injection end and open at an opposite end. The propellant is injected into the combustion chamber. A pre-detonator initiates detonation. When the detonation has finished, propellant is injected once more and a new detonation is initiated with the help of the pre-detonator. Unlike a continuous rotating detonation engine, where detonation takes place continuously, detonation in a pulse detonation engine is not continuous and needs to be re-initiated on each occasion.

The invention also provides a space launcher comprising at least one stage formed by a spacecraft of the invention.

Advantageously, said at least one stage is the last and/or last-but-one stage of the space launcher.

The first stages of a space launcher are jettisoned while the space launcher is still close enough to the earth for the earth's gravitational field to cause those first stages to drop immediately so they do not remain in orbit. In contrast, the last stage and/or the last-but-one stage of the space launcher are jettisoned once the space launcher is already in space, and too far away for the earth's gravitational field to cause those stages to drop immediately to earth. Thus, the last and/or the last-but-one stage of the launcher is/are fitted with a de-orbiting device of the invention in order to be capable of being moved away from the orbit reached and in order to be brought back into the earth's atmosphere and dropped to earth.

The invention also provides a method of de-orbiting a spacecraft of the invention, wherein said de-orbiting is performed by said de-orbiting device after said main engine has stopped, the detonation engine of the de-orbiting device being fed with propellant by the main tank at a pressure that is less than or equal to 10 (ten) bars.

It can be understood that in order to put the spacecraft onto its orbit, the main engine consumes the majority of the propellant, such that the pressure in the main tank(s) is less than or equal to 10 bars. When the main engine is stopped, it is possible to use the de-orbiting device to de-orbit the spacecraft.

Advantageously, when the spacecraft is a stage of a space launcher, said stage is separated from the space launcher after the main engine has stopped and before de-orbiting is performed.

This ensures that de-orbiting the stage has no impact on the space launcher.

BRIEF DESCRIPTION OF THE DRAWING

The invention and its advantages can be better understood on reading the following detailed description of embodiments of the invention given as non-limiting examples. The description makes reference to the accompanying figures, in which.

DETAILED DESCRIPTION OF EMBODIMENTS

It should be observed that the figures are very diagrammatic, their purpose being to show the general structure of a space launcher and of a spacecraft of the invention in as simple and as clear a manner as possible.

Figure 1:
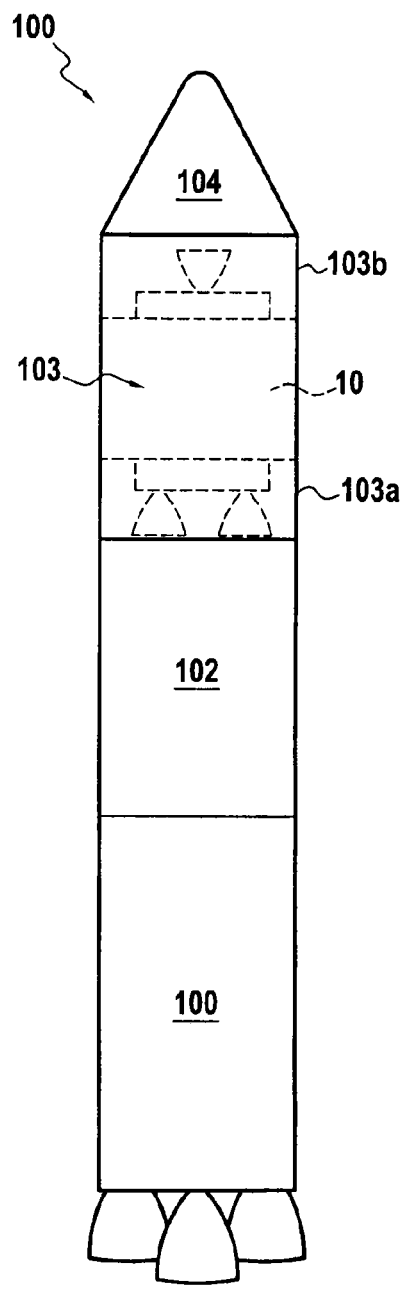
FIG. 1 shows a space launcher of the invention.

FIG. 1 shows a space launcher 100 comprising two stages, namely a first stage 101, a second stage 102, and a third and last stage 103, together with a housing 104 for housing a load for transporting into space, e.g. a satellite.

The third and last stage 103 is formed by a spacecraft 10 and includes two shrouds 103a and 103b providing geometrical continuity for the outside shape of the space launcher 100 while the third stage is secured to the second stage 102 and/or to the housing 104.

Figure 2:
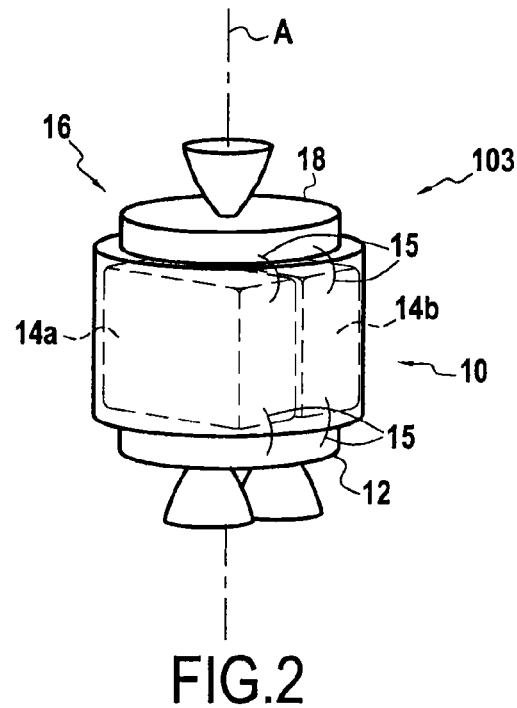
FIG. 2 shows a spacecraft of the invention forming the last stage of the FIG. 1 space launcher.

FIG. 2 shows the spacecraft 10 forming the last stage 103 of the FIG. 1 space launcher 100. The spacecraft 10 comprises a main deflagration engine 12, two main propellant tanks 14a and 14b, and a de-orbiting device 16 comprising a detonation engine 18.

The main tanks 14a and 14b respectively contain a fuel, e.g. hydrogen, and an oxidizer, e.g. oxygen, under pressure and in the liquid state. Pipes 15 connect the main tanks 14a and 14b to the main engine 12 and to the detonation engine 18, in order to feed them with propellant.

The detonation engine 18 is located opposite from the main engine 12 relative to the main tanks 14a and 14b. More precisely, the spacecraft 10 extends in an axial direction A with the main engine 12 and the detonation engine 18 lying on this axial direction A at opposite ends of the main tanks 14a and 14b.

Figure 3:
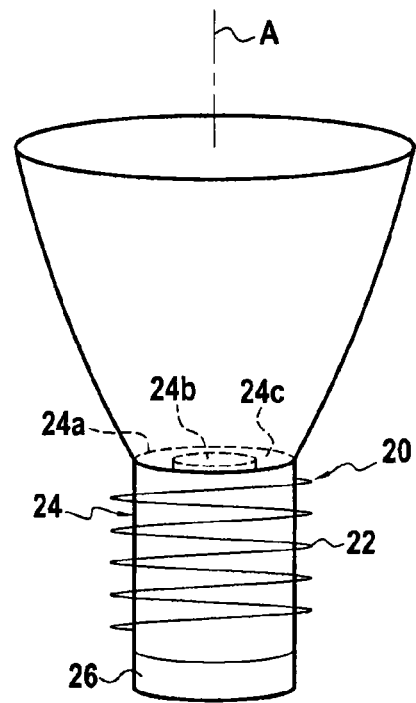
FIG. 3 shows the combustion chamber of the detonation engine of the FIG. 2 spacecraft.

As shown in FIG. 3, the detonation engine 18 has a heater 20 comprising a cooling circuit 22 in the form of a coil wound around the combustion chamber 24 in order to maintain the combustion chamber 24 at a predetermined temperature and in order to heat the propellants. The propellants as heated in this way are taken to the injection device 26 located upstream (in the propellant flow direction) from the combustion chamber 24. In this embodiment, the fuel and the oxidizer flow through the cooling circuit 22 (naturally while being kept separate, each propellant flowing in a distinct coil, even though only one coil is shown in FIG. 3). In a variant, only the fuel or only the oxidizer flows through the cooling circuit.

In this example, the detonation engine 18 is a continuous rotating detonation engine. Thus, the combustion chamber 24 presents an outer wall 24a and a core 24b, the annular space 24c that exists between the outer wall 24 and the core 24b forming the cavity where the detonation waves propagate in the azimuth direction.

With reference to FIG. 1, it can be understood that when the second stage 102 is jettisoned during the flight of the space launcher 100, the shroud 103a is also jettisoned. The main engine 12 of the third stage 103 is then ignited and drives the assembly formed by the third stage 103 and the housing 104, delivering its main thrust so as to bring said assembly into space or onto a predetermined orbit. When the main thrust from the main engine 12 has come to an end, the main engine 12 is stopped. During this main thrust, the major parts of the hydrogen and oxygen contained in the main tanks 14a and 14b are consumed, and the initial pressure within the main tanks has dropped to a pressure that is less than or equal to 10 bars. The third stage 103 and the housing 104 are then separated. During this separation, the shroud 103b is also separated from the spacecraft 10. After this separation, the de-orbiting device 16 is then activated and moves the spacecraft 10 away from the housing 104 of the spacecraft launcher 100 by igniting the detonation engine 18, which engine is fed with residual oxygen and hydrogen at low pressure contained in the main tanks 14a and 14b.

Although the present invention is described with reference to specific embodiments, it is clear that modifications and changes may be made to those examples without going beyond the general ambit of the invention as defined by the claims. In particular, the individual characteristics of the various embodiments and/or variants that are shown and/or mentioned may be combined in additional embodiments. Consequently, the description and the drawings should be considered as being illustrative rather than restrictive. For example, the second stage 102 and/or the first stage 101 may be formed by a spacecraft similar to the spacecraft 10. Furthermore, the detonation engine 18 of the spacecraft 10 could be a pulse detonation engine rather than a continuous rotating detonation engine.

The invention claimed is:

1. A spacecraft comprising:
at least one main propellant tank;
a main engine fed with propellant by the main tank; and
a de-orbiting device,
wherein the de-orbiting device comprises a detonation engine fed with propellant by the main tank, and
wherein the main engine is a deflagration engine.

2. A spacecraft according to claim 1, wherein the detonation engine includes a heater for heating the propellant such that the propellant passes from a solid or liquid phase to a gaseous phase upstream from an injector device.

3. A spacecraft according to claim 2, wherein the detonation engine includes a combustion chamber and a cooling circuit for cooling the combustion chamber, the heater including the cooling circuit.

4. A spacecraft according to claim 3, wherein the combustion chamber includes an outer wall and a core, and an annular space is formed between the outer wall and the core.

5. A spacecraft according to claim 1, wherein the detonation engine is arranged opposite from the main engine relative to the main tank.

6. A spacecraft according to claim 1, comprising two main tanks, of a fuel tank and an oxidizer tank, the main engine and the detonation engine each being connected to both main tanks.

7. A spacecraft according to claim 1, wherein the detonation engine is a continuous rotating detonation engine.

8. A spacecraft according to claim 1, wherein the detonation engine is a pulse detonation engine.

9. A space launcher comprising at least one stage comprising a spacecraft according to claim 1.

10. A space launcher according to claim 9, wherein the at least one stage is a last and/or last-but-one stage of the space launcher.

11. A method of de-orbiting a spacecraft forming a stage of a space launcher according to claim 9, wherein the stage is separated from the space launcher after stopping the main engine and before performing de-orbiting.

12. A method of de-orbiting a spacecraft according to claim 1, wherein the de-orbiting is performed by the de-orbiting device after the main engine has stopped, the detonation engine of the de-orbiting device being fed with propellant by the main tank at a pressure that is less than or equal to 10 bars.

* * * * *